United States Patent [19]

Jeffers et al.

[11] Patent Number: 5,353,169
[45] Date of Patent: Oct. 4, 1994

[54] CONTACT DUPLICATION OF MAGNETICALLY RECORDED INFORMATION WITHOUT THE USE OF A TRANSFER FIELD

[75] Inventors: Frederick J. Jeffers, Escondido, Calif.; Charles F. Brucker, Fairport, N.Y.

[73] Assignee: Eastman Kodak Company, Rochester, N.Y.

[21] Appl. No.: 652,972

[22] Filed: Feb. 11, 1991

[51] Int. Cl.⁵ .............................................. G11B 5/86
[52] U.S. Cl. ........................................ 360/16; 360/17
[58] Field of Search ............... 360/16, 17, 15; 369/84, 369/83, 85

[56] References Cited

U.S. PATENT DOCUMENTS

| | | | |
|---|---|---|---|
| 2,738,383 | 3/1956 | Herr et al. | 360/17 |
| 3,341,854 | 9/1967 | Supernowicz | 360/17 |
| 3,472,971 | 10/1969 | Van Den Berg | 360/17 |
| 4,277,806 | 7/1981 | Jeffers et al. | 360/17 |
| 5,032,931 | 7/1991 | Suzuki et al. | 360/17 |

*Primary Examiner*—Robert J. Pascal
*Assistant Examiner*—Tan Dinh
*Attorney, Agent, or Firm*—William F. Noval

[57] ABSTRACT

Apparatus for, and a method of, duplicating magnetically recorded information by contact transfer from a master medium to a slave medium in the absence of a transfer field. The slave medium comprises a dilute concentration of magnetic particles productive of a demagnetization field that is negligible compared to an external magnetic field of the master medium in its contact-transfer zone. The absence of an appreciable demagnetization field in the slave medium enables the external magnetic field of the master medium to be virtually unopposed in effecting the magnetization of the slave medium.

9 Claims, 3 Drawing Sheets

CONTACT DUPLICATION OF MAGNETICALLY RECORDED INFORMATION WITHOUT THE USE OF A TRANSFER FIELD

BACKGROUND OF THE INVENTION

1. Field Of The Invention

This invention relates to the field of magnetic recording, and in particular to the duplication of magnetically recorded information by contact transfer from a magnetically recorded master medium to a slave magnetic medium in the absence of a transfer magnetic field.

2. Description Relative To The Prior art

The expanding use of magnetic recording has generated an extensive need for low cost, high quality duplicate magnetic copies of original recordings. Some applications, such as tape copies for playback on conventional audio reproducing machines, require a linear transformation of the signal from the master to the slave copy, while other applications, such as the duplication of non-analog i.e., digital, servo or format information, or f.m. recorded videotapes, allow the use of non-linear transfer methods. Both the linear analog and the non-linear digital applications are generally performed by playing back the master on an appropriate reproducing system which drives a plurality of slave recording systems. For the linear transfer requirements, anhysteretic recording techniques known in the art are used, while for the non-linear applications hysteretic recording is acceptable.

In either case, an essential characteristic of the slave copy is that it be of high enough coercivity to resist demagnetization in normally encountered environments. Coercivities of 300–500 Oersteds are commonly employed, although a coercivity closer to 1000 Oersteds is necessary to protect the copy against accidental erasure if the slave experiences exceptionally high magnetic fields. Products incorporating the slave copy may be subjected to such high fields if the products are sold in an environment protected by a magnetically activated anti-shoplifting system currently employed in numerous retail enterprises.

Besides machine to machine copying, contact duplication methods are known in which the master medium and the slave medium are placed in intimate contact and transported through an alternating magnetic field, called the bias field. The coercivity of the master medium is always much greater than the coercivity of the slave, and the bias field strength is greater than the coercivity of the slave and less than that of the master. As the media pass through the alternating bias field, the magnetic moments of the particles in the slave are switched back and forth. As the bias field is reduced through the coercivity value of the slave, the slave particles come to rest magnetized parallel to the field of the master. This effects the magnetic transfer of the recorded information from the master to the copy. The bias field switching of the magnetization in the slave does not substantially affect the source recording on the higher coercivity master. It will be noted that this technique is effectively the same as that practiced in anhysteretic recording in the magnetic recording art.

U.S. Pat. No. 2,738,383 entitled "Method and Apparatus for Duplicating magnetic Recordings and Tape Record Members" discloses the use of a transfer field to effect master to slave contact duplication. U.S. Pat. No. 3,472,971 entitled "Magnetic Tape Duplicating Device With Fluid Pressure Applied Through Head Gap" discloses apparatus for ensuring intimate contact between the master and slave while applying a transfer field to the media during duplication.

SUMMARY OF THE INVENTION

In view of the foregoing, an object of the present invention is to provide a simplified method of, and apparatus for, duplicating magnetically recorded information by contact transfer from a master medium onto a slave medium.

This object is achieved generally by contact transfer from a master medium onto a slave medium, without the use of a transfer field. To effect this direct transfer, the master medium has a sufficiently high coercivity and remanence so that information recorded thereon is productive of a magnetic field the intensity of which, in an external contact-transfer zone, is at least as great as the remanent coercivity of the slave medium. The slave medium, on the other hand, is comprised of a relatively dilute concentration level of magnetic particles productive of a demagnetization field that is negligible compared to the magnetic field of the master medium in its contact-transfer zone. The absence of an appreciable demagnetization field in the slave, due to its dilute magnetic layer, means that the field of the master is virtually unopposed in effecting a magnetization of the slave medium that is a mirror image of the magnetization pattern recorded on the master medium, thereby performing direct contact duplication without the need of a transfer field.

In a preferred embodiment, a master medium is in the form of a roller having a cylindrical surface comprising one or more high coercivity magnetic layers on which information is recorded. A relatively high coercivity slave medium, in the form of a flexible tape, is transported from a supply reel to a take-up reel in intimate rolling contact with the master roller. As the moving tape contacts the recorded surface of the roller, the information recorded on the roller is magnetically transferred to the tape. The information recorded on the master is thereby repetitively duplicated down the length of the slave tape.

The practice of the invention has particular applicability in the photographic film art wherein a magnetic medium having a low concentration of magnetic particles can be formed on photographic film, without measurably affecting the optical characteristics of the film. With an "unobtrusive" magnetic medium, film characteristics, useful for example in photographic processing, can be prerecorded. At the same time, the requirement of a negligible demagnetization field in the slave medium, required for the practice of the present invention, is met.

This advantage of the invention, as well as detailed description of a preferred embodiment other advantages, will become more apparent in the presented below.

BRIEF DESCRIPTION OF THE DRAWINGS

The invention will be described in relation to the figures, of which.

DESCRIPTION OF A PREFERRED EMBODIMENT

Figure 1:
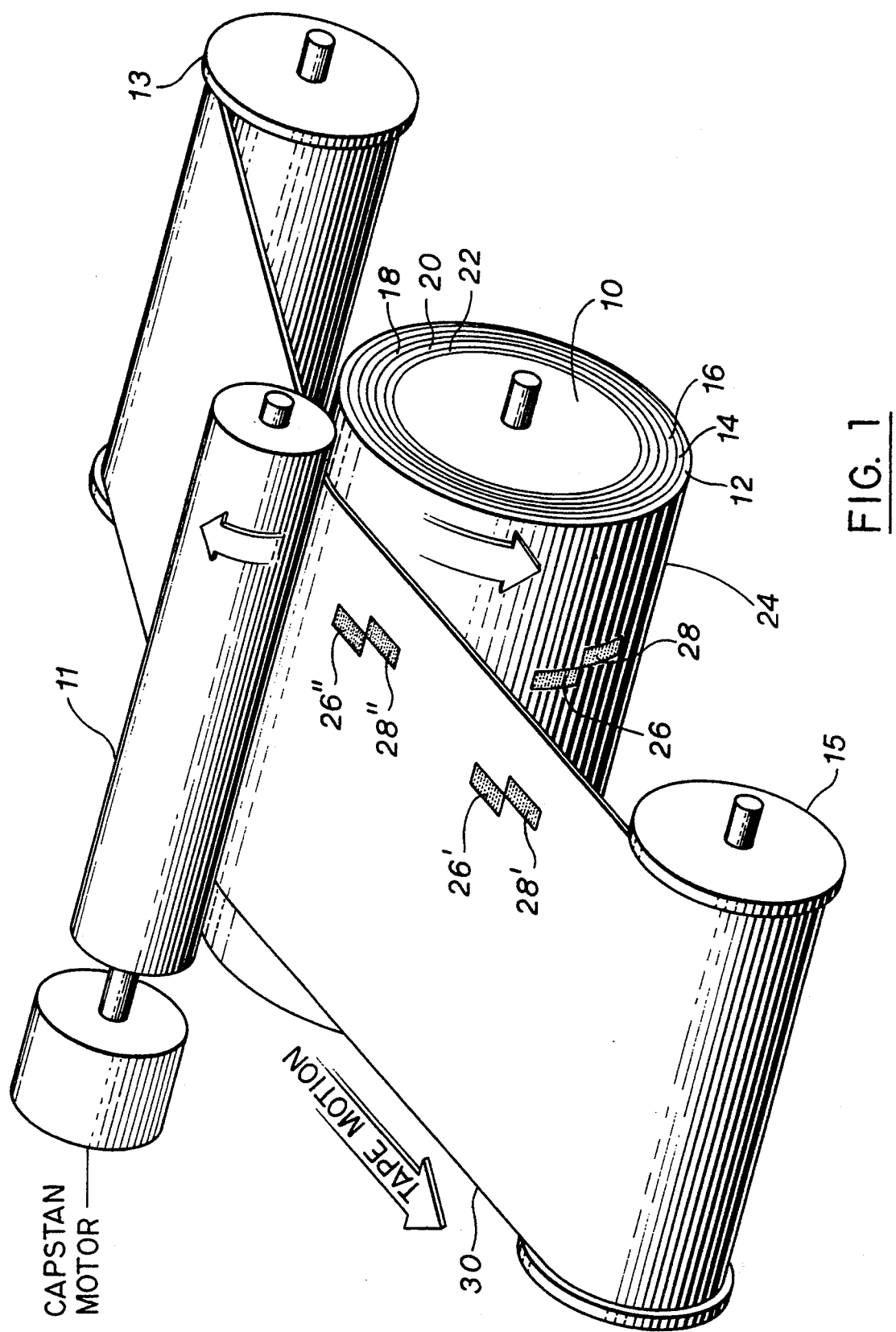
FIG. 1 is a drawing of apparatus in accordance with the invention.

FIG. 1 shows a presently preferred embodiment of a master medium. As shown, the master medium is comprised of a roller 10 having CoPt magnetic layers 12, 14, 16, 18, 20, 22 deposited thereon to provide a magnetic cylindrical surface 24. The CoPt layers 12–22 are fabricated in accordance with the teaching of U.S. Pat. No. 4,902,583 entitled "Thick Deposited Cobalt Platinum Magnetic Film and Method of Fabrication Thereof" issued in the names of Brucker et al., the disclosure of which is incorporated herein by reference.

Figure 2:
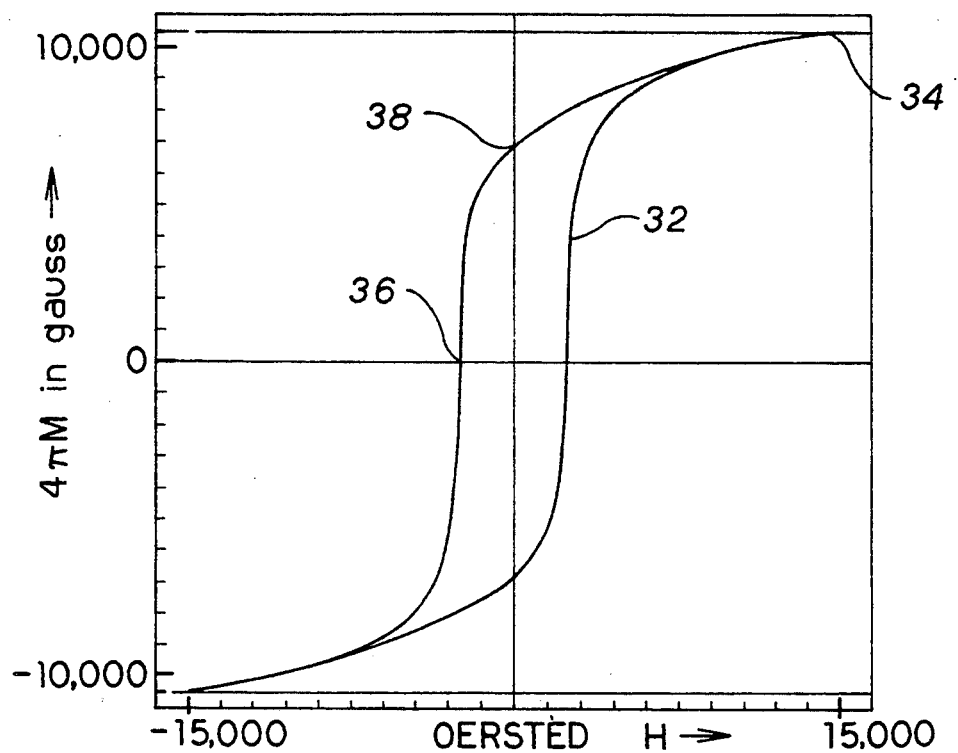
FIG. 2 is a plot of the $4\pi M$-H loop of master medium comprised of one layer of CoPt.

The invention requires that the master medium have a coercivity and remanence sufficiently high so that information recorded thereon is productive of an external magnetic field, the intensity of which is at least as great as the remanent coercivity of a slave medium. A magnetic induction vs. magnetic field intensity ($4\pi$M vs H) hysteresis loop 32 of a single one of the layers 12–22 is seen in FIG. 2. The hysteresis loop of FIG. 2 is for a layer of a thickness of 0.5 micron ($\mu$). As shown, a single layer has a saturation magnetic induction, 34, of 10,470 gauss, a coercivity, 36, of 2370 Oersteds and a remanent magnetic induction, 38, of 6957 gauss.

With the data of FIG. 2 for a single layer of CoPt, the well known equations derived by R. L. Wallace, Jr. may be used to calculate the external field intensity when a signal is recorded on the layer. (See the article "The Reproduction of Magnetically Recorded Signals", R. L. Wallace, Jr., reprinted in "Introduction to Magnetic Recording", edited by Robert M. White, IEEE Press, New York, N.Y. 1985, pp. 226–240). The Wallace equations take into account effects of demagnetizing fields, spacing loss and distance from the surface, as functions of the wavelength of the signal recorded and the depth of recording. In general, a recording on the layer of magnetic material is assumed to be in the form of a square wave. The calculated external magnetic fields may be thought of as arising from the fundamental component of the recorded pattern.

Figure 3:
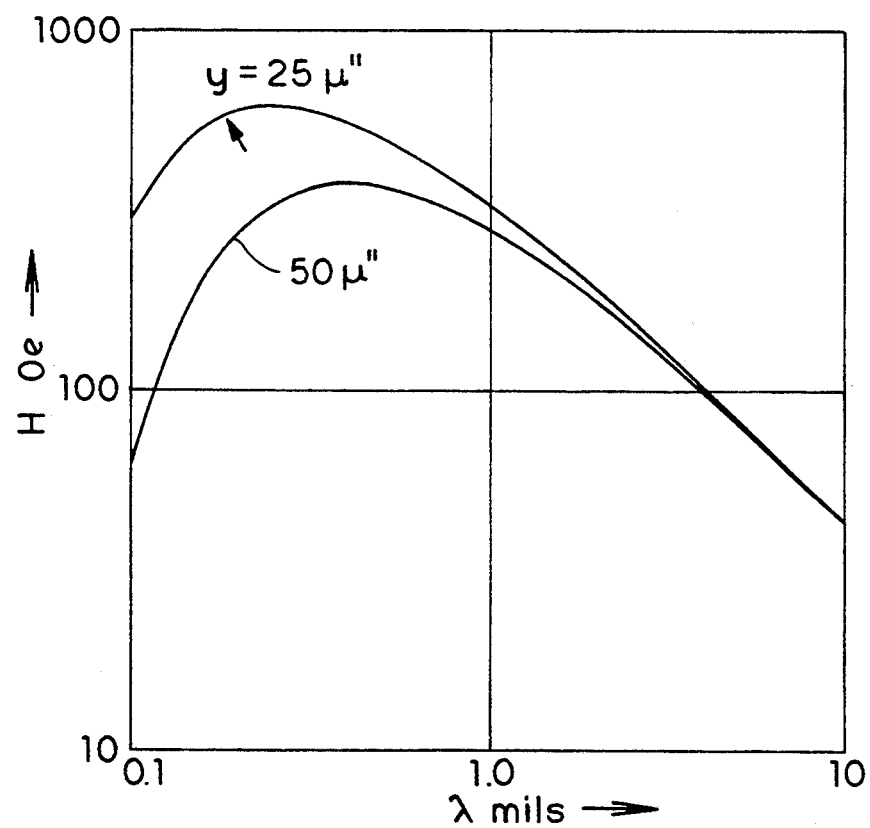
FIG. 3 is a plot of the magnetic field intensity H, external the magnetic medium of FIG. 2, as a function of recorded wavelength.

It is assumed initially that there is only a single layer of CoPt (0.5$\mu$ thick) at the roller surface 24, and that the recording extends through the entire thickness of that layer. For a single CoPt layer, calculated values of an external magnetic field produced by a sinusoidal recording are shown in FIG. 3 where field amplitude is plotted as function of recorded wavelength in mils (0.001"), for two values of the parameter, Y, the height above the surface in microinches. It may be seen from FIG. 3 that the external field values for a single layer at 1 mil wavelength is less than 500 Oarsteds. This, of course, is not a large enough field to effect direct contact duplication to a slave medium of a coercivity greater than 500 Oersteds.

It is known in the art, however, that stacking layers of magnetic material increases the field from the resultant stack in proportion to the total thickness. It is also known that, for a material of coercivity $H_c$, the maximum surface field is approximately 88% of the coercivity, for a material whose B-H loop is essentially square. In the presently preferred embodiment, six layers (FIG. 1, 12–22) of CoPt are employed to provide a magnetic master of a thickness of three microns.

Figure 4:
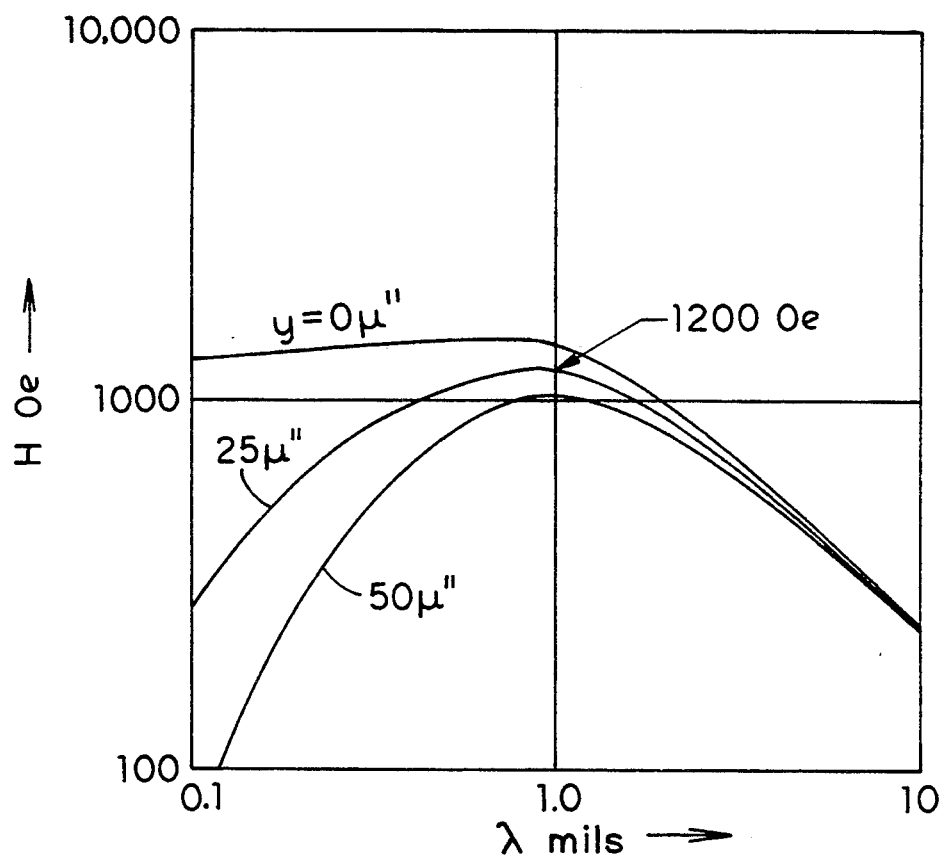
FIG. 4 is a plot of the magnetic field intensity H, external a master medium, in accordance with the invention, as a function of recorded wavelength.

FIG. 4 shows the calculated fields for the resulting 3-$\mu$ CoPt layer. As shown, a field of about 1200 Oersteds is present at a height of y=25 microinches above the surface of the composite master medium at 1 mil wavelength. (A nominal separation of 25 microinches is assumed to allow for the practical problem of not being able to achieve perfect contact between master and slave.) As will be seen below, a field of 1200 Oersteds is adequate to effect contact transfer of information from a master medium to a high-coercivity slave medium, without the use of an auxiliary transfer field.

As previously stated, it is desired that a slave medium have a high enough coercivity to be immune from inadvertent erasure by stray magnetic fields that might be encountered in the environment. The invention further requires a slave medium productive of a demagnetization field that is negligible compared to the magnetic field of the master medium in its contact transfer zone. For the purpose of a negligible demagnetization field, a slave medium is comprised of a relatively dilute concentration of magnetic particles. More specifically, a slave medium, according to a presently preferred embodiment, includes $Fe_2O_3$ magnetic particles with absorbed cobalt on their surfaces, the particles being in a very dilute concentration of 6.2 mg per square foot of film surface. The coating has a thickness of 200 microinches. A magnetic medium having dispersed (dilute) magnetic particles is disclosed in U.S. Pat. No. 3,782,947, the disclosure of which is incorporated herein by reference.

Figure 5:
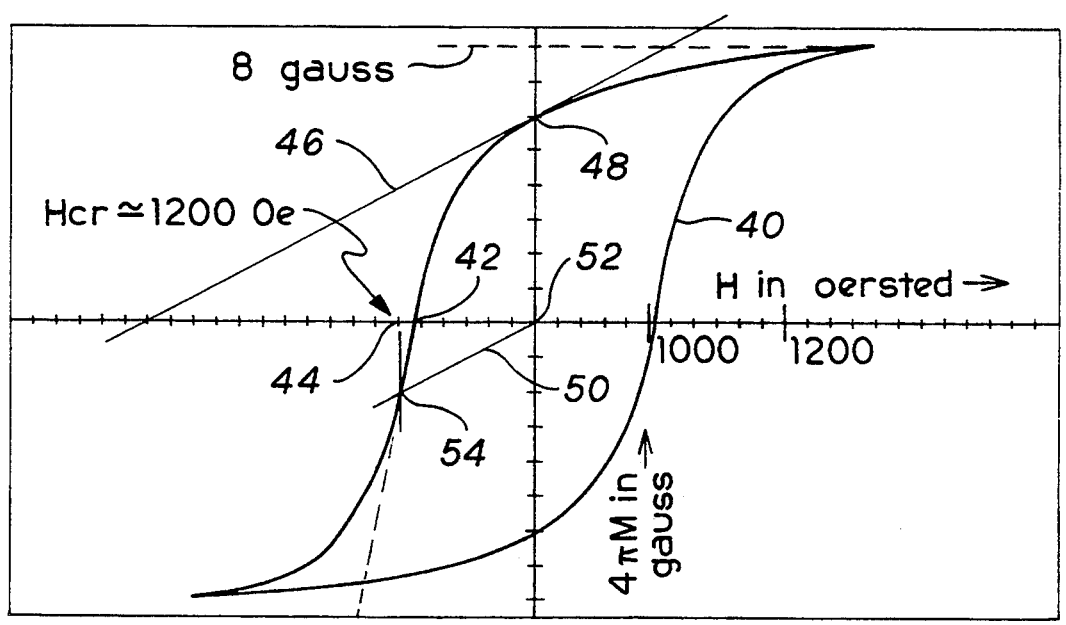
FIG. 5 is a plot of the $4\pi$M-H loop of a dilute slave medium in accordance with the invention.

Reference is now made to FIG. 5 for determining the coercivity and demagnetization of the magnetically dilute slave medium. A $4\pi$M-H loop, 40, (magnetic induction $4\pi$M vs. magnetic field intensity H) for the magnetically dilute slave medium shows a coercivity 42 approximately equal to 1016 Oersteds. An important parameter governing direct contact magnetic transfer, however, is the remanent coercivity of the slave medium. To determine remanent coercivity of a slave medium having the characteristics of FIG. 5, a line 46 is drawn tangent to the loop 40 at the retentivity point 48. A line 50, parallel to the line 46 and passing through the origin 52, intersects the loop 40 at the point 54. The value of field intensity 44 for the intersection 54, is defined as the remanent coercivity, $H_{cr}$. For the medium of FIG. 5, $H_{cr}$ is approximately 1200 Oersteds. This meets the above stated criteria for immunity against accidental erasure.

Consider now the demagnetization field of the slave medium. It is known in the art, and is readily shown by means of a Preisach diagram, that when a demagnetized particular medium is subjected to a field intensity equal to $H_{cr}$, the remanent induction (after the H field is removed) is equal to 50% of the saturation induction for the material. Recall that the external field of the master medium, i.e., roller 10, is 1200 Oersteds. In other words, when the slave medium of FIG. 5 experiences a 1200 Oersteds field, it will retain a magnetization of about 50% of its saturation value.

As shown, the measured saturation of the slave medium of FIG. 5 is eight gauss; therefore, the remanent magnetization in the slave is about four gauss. A demagnetization field is given by the expression, $H_d = 4\pi M * N$, where $4\pi$M equals the remanent magnetization in gauss, and N is the demagnetization factor. Assuming a typical case value of N=0.7, the amplitude of the demagnetization field of the medium of FIG. 5 is only 2.8 Oersteds.

As previously shown, the field at a height of 25 $\mu''$ above the surface of the master medium is 1200 Oarsteds at 1 mil wavelength. Therefore, the demagnetization field of the dilute slave medium is less than 1% of the external field of the master medium. In other words, the demagnetization field, relative to the external field of the master medium, is negligible and can be ignored. The absence of an appreciable demagnetization field in the slave medium means that the external magnetic field of the master medium is virtually unopposed in effecting, by contact transfer, the magnetization of the slave medium. A dilute slave medium, in a direct contact transfer system, may accordingly be defined as having a demagnetization field of less than 1% of the master surface field.

Referring back to FIG. 1, signals 26, 28 are saturation recorded on the surface 24 of the roller 10 by methods known in the art. The signals 26, 28 are repetitively duplicated 26', 28' and 26'', 28'' onto a moving dilute magnetic slave medium 30 having characteristics of the type shown in FIG. 5. This transfer is brought about by means of a capstan 11 which causes rotation of both the roller 10 and the medium 30 at a controlled, predetermined speed. In doing so, the capstan 11 pinches the slave medium 30 against the cylindrical surface 24 of the roller 10 to, in effect, transport the slave medium through a contact-transfer zone of the master medium, in intimate, non-slipping contact with the rotating roller 10. As the slave medium 30 is transported from a supply reel 13 to a take-up reel 15, the roller 10 effects a magnetization of the slave medium 30 that is a mirror image of the magnetization pattern recorded on the surface 24 of the master medium.

In a playback mode, the magnetization of the slave medium may be detected by means of a magnetoresistive reproduce head or an inductive-type head sensitive to the rate-of-change of flux, as is known in the art.

The invention has been described in detail with particular reference to preferred embodiments thereof, but it will be understood that variations and modifications can be effected within the spirit and scope of the invention. For example, while the invention has been described in terms of transfer of information from one magnetic medium to another magnetic medium, it will be appreciated that the "slave" magnetic medium may form part of a transparent photographic film or translucent film or an optically opaque medium such as paper.

What is claimed is:

1. A system for duplicating magnetically recorded information by contact transfer from a master medium to a slave medium, said system comprising:
    a) said master medium having a sufficiently high coercivity and remanence so that information recorded thereon is productive of a magnetic field the intensity of which, in an external contact-transfer zone, is at least as greater as the remanent coercivity of said slave medium;
    b) said slave medium having a demagnetization field that is negligible compared to the magnetic field of said master medium in its contact-transfer zone; and
    c) a mechanism for transporting said slave medium through the contact-transfer zone of said master medium in non-slipping engagement therewith, to effect a magnetization of said slave medium that is the mirror image of the magnetization pattern recorded on said master medium by direct magnetization of said slave medium by said magnetic field of said master medium without the use of an independent magnetic transfer field, whereby the absence of an appreciable demagnetization field in said slave medium enables the external magnetic field of said master medium to be virtually unopposed in effecting said magnetization of said slave medium.

2. A system as defined in claim 1 wherein the magnetic field of said master medium in said contact-transfer zone exceeds 100 times the demagnetization field of said slave medium.

3. A system as defined in claim 1 wherein the coercivity of said slave medium exceeds 1000 Oersteds.

4. A system as defined in claim 2 wherein said master medium is comprised of a magnetizable cylindrical surface.

5. A system as defined in claim 4 wherein said magnetizable cylindrical surface is CoPt.

6. A system as defined in claim 4 wherein said magnetizable cylindrical surface is comprised of a plurality of layers of CoPt.

7. A method for duplicating magnetically recorded information by contact transfer from a master medium to a slave medium of relatively high coercivity in the absence of a transfer magnetic field, said method comprising;
    a) recording information on a master medium having a sufficiently high coercivity and remanence so that the information recorded thereon is productive of a magnetic field the intensity of which, in an external contact-transfer zone, is at least as great as the remanent coercivity of the slave medium; and
    b) transporting the slave medium through the contact-transfer zone of the master medium in non-slipping engagement therewith, the relatively high-coercivity slave medium comprising a relatively dilute concentration of magnetic particles productive of a demagnetization field that is negligible compared to the magnetic field of the master medium in its contact-transfer zone, to enable the external magnetic field of the master medium to be virtually unopposed in effecting a magnetization of the slave medium that is a mirror image of the magnetization pattern recorded on the master medium.

8. A system as defined in claim 1 wherein said slave medium is comprised of a relatively dilute concentration of magnetic particles productive of said demagnetization field.

9. A system as defined in claim 8 wherein said slave medium is a part of a photographic film.

* * * * *